United States Patent [19]

Shibata et al.

[11] Patent Number: 5,404,278
[45] Date of Patent: Apr. 4, 1995

[54] VEHICULAR CORNERING LAMP SYSTEM

[75] Inventors: Hiroki Shibata; Hideki Ohashi, both of Shizuoka, Japan

[73] Assignee: Koito Manufacturing Co., Ltd., Tokyo, Japan

[21] Appl. No.: 153,041

[22] Filed: Nov. 17, 1993

[30] Foreign Application Priority Data

Nov. 19, 1992 [JP] Japan .............................. 4-085465 U

[51] Int. Cl.$^6$ .............................................. B60Q 1/12
[52] U.S. Cl. ..................................... 362/83.3; 362/36; 362/37; 362/41; 315/81
[58] Field of Search ........................ 362/36, 41, 37, 40, 362/83.3; 315/81

[56] References Cited

U.S. PATENT DOCUMENTS

| | | | |
|---|---|---|---|
| 1,174,154 | 3/1916 | Howard | 362/40 |
| 3,023,344 | 2/1962 | Owings | 362/37 |
| 4,663,696 | 5/1987 | Miyazawa et al. | 362/80 |
| 4,733,333 | 3/1988 | Shibata et al. | 362/40 |
| 4,827,388 | 5/1989 | Miyazawa | 362/284 |
| 4,831,506 | 5/1989 | Miyazawa | 362/284 |
| 4,860,601 | 8/1989 | Shibata et al. | 73/865.8 |
| 4,908,560 | 3/1990 | Shibata et al. | 318/603 |
| 4,943,893 | 7/1990 | Shibata et al. | 362/37 |
| 4,963,794 | 10/1990 | Shibata et al. | 315/81 |
| 4,970,906 | 11/1990 | Shibata et al. | 73/865.8 |

FOREIGN PATENT DOCUMENTS

3704029 8/1988 Germany .

Primary Examiner—Ira S. Lazarus
Assistant Examiner—L. Heyman
Attorney, Agent, or Firm—Sughrue, Mion, Zinn, Macpeak & Seas

[57] ABSTRACT

A vehicular cornering lamp system in which the amount of electric power consumed by the lamp is minimized. Until the angle of rightward (leftward) steering with respect to the position of straight-ahead steering reaches a predetermined angle $\theta_R$ ($\theta_L$), the right (left) SI lamp remains turned off and the illuminating angle thereof is fixed to 30° in the right (left) direction. After the point of time when the steering angle reaches $\theta_R$ R ($\theta_L$), the right (left) SI lamp is turned on and the illuminating angle is changed in accordance with steering direction.

10 Claims, 6 Drawing Sheets

VEHICULAR CORNERING LAMP SYSTEM

BACKGROUND OF THE INVENTION

The present invention relates to a vehicular cornering lamp system for variably changing the illuminating direction of a lighting device in accordance with a direction of steering of the vehicle.

Automotive vehicles have a pair of headlamps provided on left and right sides of the front of the vehicle in order to provide illumination in the forward direction. The headlamps are fixedly mounted so as to provide illumination only the forward direction of the vehicle. As a result, when the vehicle is traveling on a curry road, it is impossible to always provide sufficient illumination in the direction of movement of the car, sometimes creating a dangerous situation.

To solve this problem, the addition of auxiliary headlamps having a wide diffusion angle may be considered. However, with this approach there arises a problem in that the road surface may be made to look relatively dark when the vehicle is traveling on a straight road because of light reflected from a guardrail along the shoulder of the road.

There has been recently been proposed a cornering lamp system in which "steering interlock" (SI) lamps are provided whose illuminating direction (illuminating angle) is varied in accordance with the steering direction of the vehicle so that the road in the direction of movement of the vehicle is continuously illuminated by the SI lamps.

For example, there has been proposed a cornering lamp system in which the illuminating direction of a right SI lamp is changed when steering to the right while the illuminating direction of a left SI lamp is fixed in the forward direction (straight-ahead direction: illuminating angle 0°), whereas the illuminating direction of the left SI lamp is changed when steering to the left while the illuminating direction of the right SI lamp is fixed in the forward direction.

If such a cornering lamp system is employed, light reflected from the guardrail can be eliminated by reducing the diffusion angle, and safety for nighttime driving is enhanced because bright illumination is always provided in the direction of movement of the vehicle.

In the above-mentioned cornering lamp system, however, auxiliary headlamps (left and right SI lamps) other than the headlamps must be operated continuously. There is a problem, therefore, in that the total amount of electric power consumed by the headlamps is high.

SUMMARY OF THE INVENTION

The present invention is intended to solve the aforementioned problems, and hence has as an object the provision of a vehicular cornering lamp system in which the amount of electric power consumed by the headlamps can be reduced.

To attain the foregoing and other objects, a cornering headlamp system of the present invention includes: a first illuminating direction fixing means for fixing the illuminating direction of right lighting means at a predetermined angle in the rightward direction of the vehicle while the right lighting means is turned off until the angle of rightward steering with respect to the direction or position of straight steering reaches a predetermined value $\theta_R$; a second illuminating direction fixing means for fixing the illuminating direction of left lighting means at a predetermined angle in the leftward direction of the vehicle while the left lighting means is turned off until the angle of leftward steering with respect to the position of straight steering reaches a predetermined value $\theta_L$; a first illuminating direction changing means for changing the illuminating direction of the right lighting means while the right lighting means is turned on in accordance with the steering direction of the vehicle after the steering angle reaches the predetermined value $\theta_R$; and a second illuminating direction changing means for changing the illuminating direction of the left lighting means in accordance with the steering direction while the left lighting means is turned on after the angle of steering reaches the predetermined value $\theta_L$.

According to the present invention, in the case where the steering angle is in a range from a predetermined value $\theta_L$ to a predetermined value $\theta_R$, both the left lighting means and the right lighting means are turned off and held in a standby state, with the illuminating directions thereof set at predetermined angles in respective left and right directions with respect to the forward direction of the vehicle.

When the steering angle reaches $\theta_R$, the right lighting means is turned on, and the illuminating direction thereof is then changed in accordance with the steering direction of the vehicle.

On the other hand, when the steering angle reaches $\theta_L$, the left lighting means is turned on, and the illuminating direction thereof is then changed in accordance with the steering direction of the vehicle.

BRIEF DESCRIPTION OF THE DRAWINGS

FIGS. 3(a)-3(d) are waveform diagrams for explaining the basic operation of a right illuminating direction control circuit in the case where an operation mode switching circuit and a lamp on/off circuit are not provided in the cornering lamp system;

DESCRIPTION OF THE PREFERRED EMBODIMENTS

The present invention will be described below in more detail with reference to preferred embodiments thereof.

Figure 1:
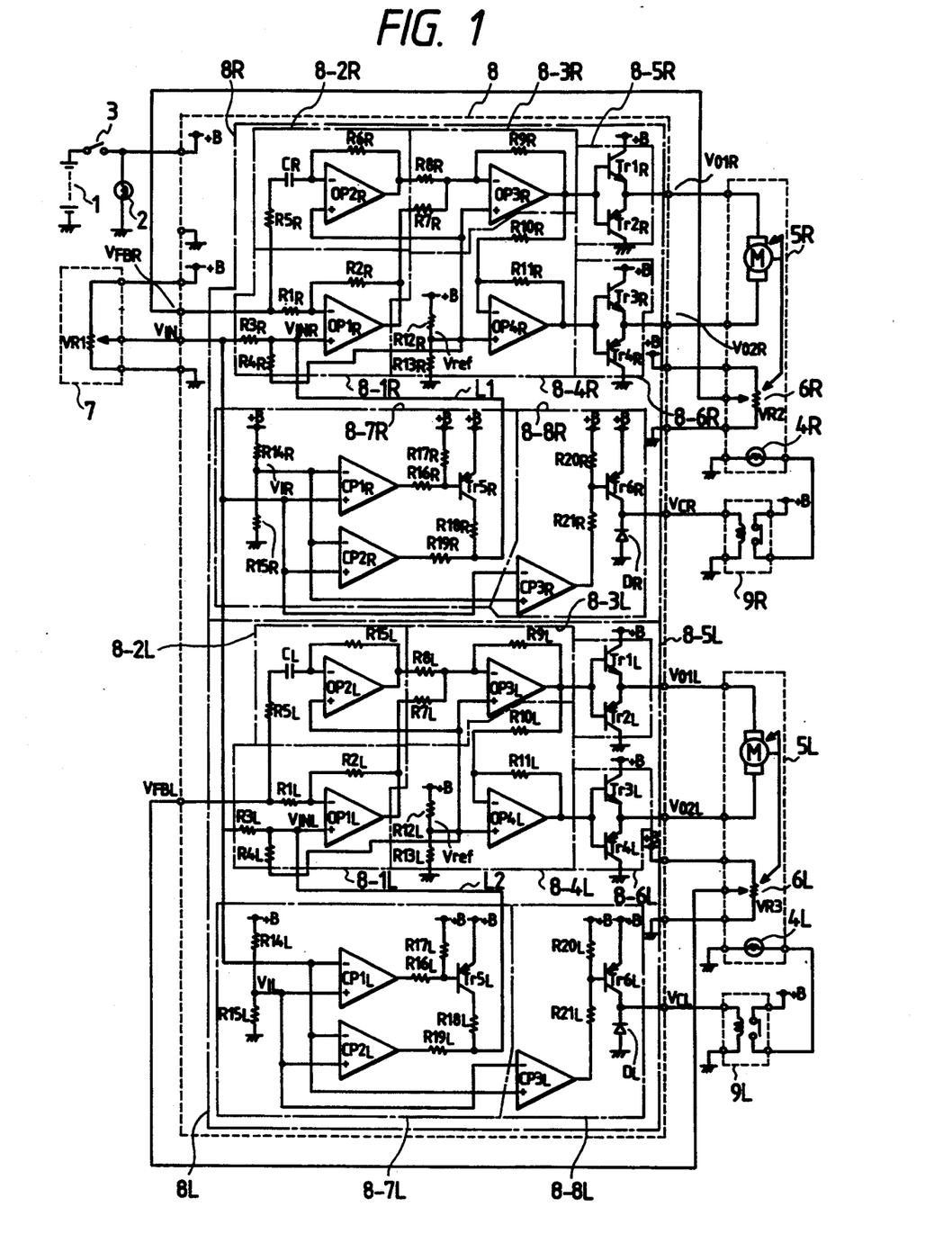
FIG. 1 is a circuit diagram of a vehicular cornering lamp system constructed according to a preferred embodiment of the present invention.

FIG. 1 is a circuit diagram of a vehicular cornering lamp system constructed in accordance with a preferred embodiment of the present invention. In the drawing, reference numeral 1 designates a car battery; 2, a tail lamp; 3, a lighting switch; 4R, a right SI lamp; 4L, a left SI lamp; 5R, a motor for variably changing the illuminating angle of the right SI lamp 4R; 5L, a motor for variably changing the illuminating angle of the left SI lamp 4L; 6R, a right lamp illuminating angle sensor for outputting a voltage $V_{FBR}$ corresponding to the illuminating angle of the right SI lamp 4R in accordance with the rotation of the motor 5R; 6L, a left lamp illuminating angle sensor for outputting a voltage $V_{FBL}$ corresponding to the illuminating angle of the left SI lamp 4L in accordance with the rotation of the motor 5L; 7, a steering sensor for outputting a voltage $V_{IN}$ corresponding to the rotation angle of the steering wheel of the vehicle, that is, the steering angle of the vehicle (the actual relationship between the rotation angle of the steering wheel and the steering angle of the vehicle can be easily determined without undue experimentation); 8, an illuminating direction control circuit constituted by a right illuminating direction control circuit 8R and a left illuminating direction control circuit 8L; 9R, a right relay; and 9L, a left relay.

In this embodiment, each of the lamp illuminating angle sensors 6R and 6L and the steering sensor 7 is constituted by a variable resistor.

Figure 2:
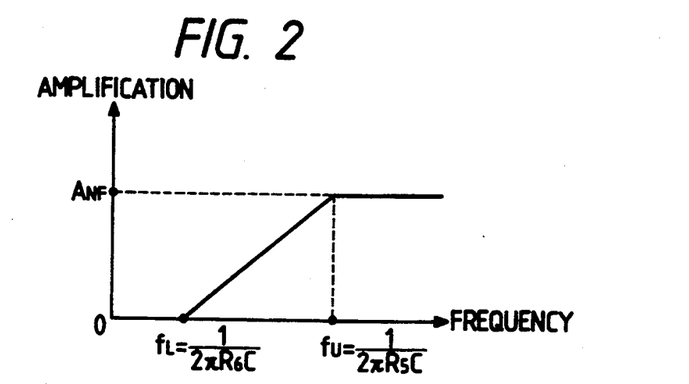
FIG. 2 is a graph showing frequency-amplification factor characteristics of a differentiator in the cornering lamp system of FIG. 1.

In the right illuminating direction control circuit 8R, reference numeral 8-1R designates a differential amplifier for amplifying the difference between the output voltage $V_{FBR}$ of the right lamp illuminating angle sensor 6R and the output voltage $V_{IN}$ of the steering sensor 7; 8-2R, a differentiator having the frequency characteristics and amplification factor shown in FIG. 2 and which is used for performing detection and inverting amplification of the change of an input voltage (output voltage $V_{FBR}$); 8-3R, an adder for performing addition and inverting amplification of the output voltage of the differential amplifier 8-1R and the output voltage of the differentiator 8-2R; 8-4R, an inverting amplifier for performing inverting amplification of the output voltage of the adder 8-3R with respect to a reference voltage $V_{ref}$ corresponding to the illuminating angle (0°) when the vehicle is traveling in the straight-ahead direction; 8-5R, a first booster circuit for performing power amplification of the output voltage of the adder 8-3R; 8-6R, a second booster circuit for performing power amplification of the output voltage of the inverting amplifier 8-4R; 8-7R, an operation mode switching circuit; and 8-8R, a lamp on/off circuit.

The differential amplifier 8-1R is constituted by an operational amplifier $OP1_R$ and resistors $R1_R$ to $R4_R$ ($R1_R = R3_R$, $R2_R = R4_R$) and amplifies the difference between $V_{IN}$ and $V_{FBR}$ by a factor $R2_R/R1_R$. The differentiator 8-2R is constituted by an operational amplifier $OP2_R$, resistors $R5_R$ and $R6_R$ and a capacitor $C_R$. In the frequency characteristics shown in FIG. 2, as the absolute value of the change of the input voltage increases, the differentiator 8-2R generates an output voltage having a larger absolute value with respect to the reference voltage $V_{ref}$.

The adder 8-3R is constituted by an operational amplifier $OP3_R$ and resistors $R7_R$ to $R9_R$. The adder 8-3R amplifies the output voltages of the differential amplifier 8-1R and the differentiator 8-2R by factors $R9_R/R7_R$ and $R9_R/R8_R$, respectively, and adds the amplified voltages. The inverting amplifier 8-4R is constituted by an operational amplifier $OP4_R$ and resistors $R10_R$ to $R13_R$ ($R10_R = R11_R$, $R12_R = R13_R$). The first booster circuit 8-5R is constituted by transistors $Tr1_R$ and $Tr2_R$. The second booster circuit 8-6R is constituted by transistors $Tr3_R$ and $Tr4_R$.

The operation mode switching circuit 8-7R is constituted by comparators $CP1_R$ and $CP2_R$, a transistor $Tr5_R$ and resistors $R14_R$ to $R19_R$. The output voltage $V_{IN}$ of the steering sensor 7 is fed to respective noninverting input terminals of the comparators $CP1_R$ and $CP2_R$. A tap voltage $V_{tR}$ determined by the resistors $R14_R$ and $R15_R$ is fed as a comparative reference voltage to respective inverting input terminals of the comparators $CP1_R$ and $CP2_R$. The junction of the resistors $R18_R$ and $R19_R$ ($R18_R$, $R19_R$ < < $R3_R$, $R4_R$) is connected to a noninverting input terminal of the operational amplifier $OP1_R$ in the differential amplifier 8-1R by line L1.

The lamp on/off circuit 8-8R is constituted by a comparator $CP3_R$, a transistor $Tr6_R$, a diode $D_R$ and resistors $R20_R$ and $R21_R$. The output voltage $V_{IN}$ of the steering sensor 7 is fed to an inverting input terminal of the comparator $CP3_R$. The comparative reference voltage $V_{tR}$ is fed to a noninverting input terminal of the comparator $CP3_R$.

In the circuit configuration of the right illuminating direction control circuit 8R, the output voltage $V_{O1R}$ of the first booster circuit 8-5R is supplied to one terminal of the motor 5R, the output voltage $V_{O2R}$ of the second booster circuit 8-6R is supplied to the other terminal of the motor 9, and the output voltage $V_{CR}$ of the lamp on/off circuit 8-8R is supplied to the right relay 9R.

In the left illuminating direction control circuit 8L, the reference numeral 8-1L designates a differential amplifier for amplifying the difference between the output voltage $V_{FBL}$ of the left lamp illuminating angle sensor 6L and the output voltage $V_{IN}$ of the steering sensor 7; 8-2L, a differentiator having the frequency characteristics and amplification factor shown in FIG. 2 and for performing detection and inverting amplification of the change of an input voltage (output voltage $V_{FBL}$); 8-3L, an adder for performing addition and inverting amplification of the output voltage of the differential amplifier 8-1L and the output voltage of the differentiator 8-2L; 8-4L, an inverting amplifier for performing inverting amplification of the output voltage of the adder 8-3L with respect to a reference voltage $V_{ref}$ corresponding to the illuminating angle (0°) when the vehicle is traveling in the straight-ahead direction; 8-5L, a first booster circuit for performing power amplification of the output voltage of the adder 8-3L; 8-6L, a second booster circuit for performing power amplification of the output voltage of the inverting amplifier 8-4L; 8-7L, an operation mode switching circuit; and 8-8L, a lamp on/off circuit. The respective parts have the same configuration as corresponding parts in the right illuminating direction control circuit 8R.

The operation of the inventive cornering lamp system will now be described.

First, for simplification of description, the basic operation of the illuminating direction control circuit 8R will be described in the case where the operation mode switching circuit 8-7R and the lamp on/off circuit 8-8R are not provided.

Assume now the case where the actual illuminating angle is coincident with the target illuminating angle (0°) because the vehicle is traveling in the straight-ahead direction, that is, the case where the illuminating angle is in the forward direction, so that the difference between $V_{FBR}$ and $V_{IN}$ is zero. In this case, the output voltages $V_{O1R}$ and $V_{O2R}$ of the first and second booster circuits 8-5R and 8-6R are both set to 6 V, and the motor 5R is kept in a stopped state.

Figure 3A:
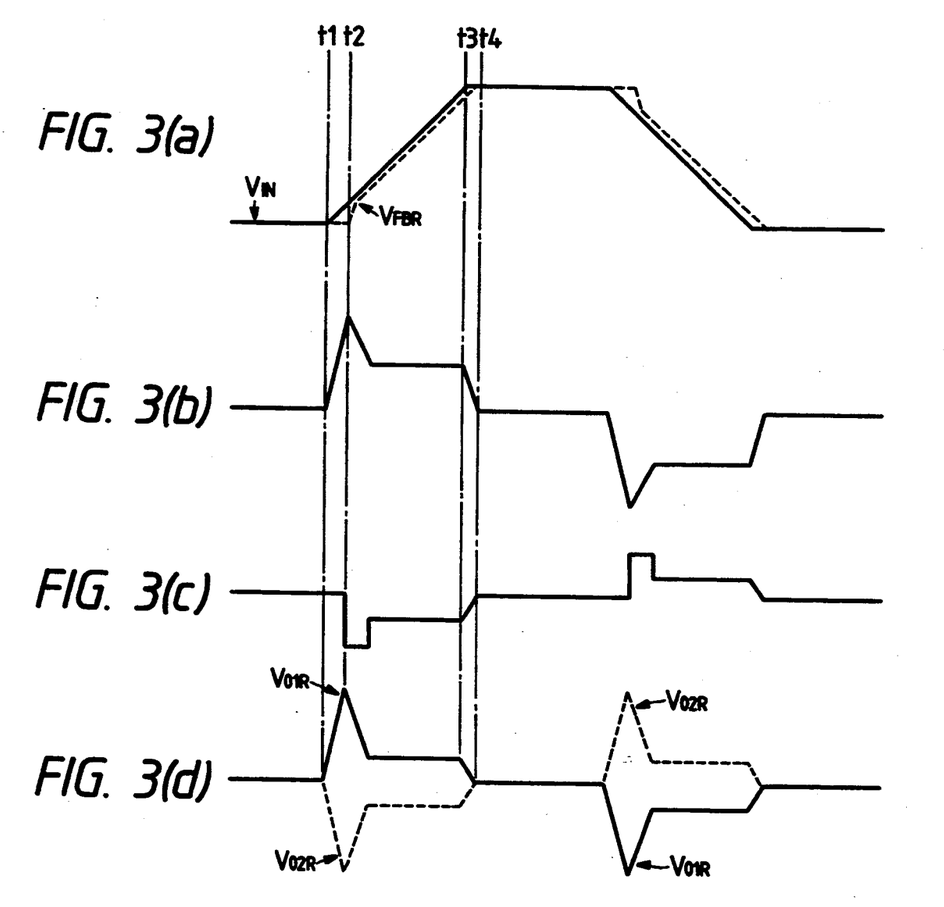

When the increase of $V_{IN}$ from time t1 shown in of FIG. 3(a) is started in accordance with rightward steering from the above-mentioned state, an amplification voltage corresponding to the difference between $V_{IN}$ and $V_{FBR}$ is obtained from the differential amplifier 8-1R (see FIG. 3(b)). The output voltage of the differential amplifier 8-1R and the output voltage of the differentiator 8-2R are added and invertingly amplified by the adder 8-3R. At this point of time, the output voltage of the differentiator 8-2R is kept at level of the reference voltage value $V_{ref}$ because $V_{FBR}$ has not changed yet (see FIG. 3(c)). That is, an output voltage formed as the result of addition and inverting amplification of the output voltage $V_{ref}$ of the differentiator 8-2R and the output voltage of the differential amplifier 8-1R is obtained from the adder 8-3R, and an output voltage formed as a result of further inverting amplification thereof is obtained from the inverting amplifier 8-4R. Accordingly, the output voltage $V_{O1R}$ of the first booster circuit 8-5R begins to increase, and the output voltage $V_{O2R}$ of the second booster circuit 8-6 begins to decrease (see FIG. 3(c)). That is, the voltage supplied between the opposite terminals of the motor 5R changes continuously to increase the voltage difference therebetween, so that the current supplied to the motor 5R increases slowly.

When the voltage difference supplied between the opposite terminals of the motor 5R is further widened so that it reaches time t2, the rotation of the motor 5R starts. As a result, the output voltage $V_{FBR}$ begins to increase, and the difference between $V_{FBR}$ and $V_{O2R}$ begins to decrease, so that the output voltages $V_{O1R}$ and $V_{O2R}$ begin to decrease and increase, respectively. That is, the voltage supplied between the opposite terminals of the motor 5R changes continuously to narrow the voltage difference therebetween, so that the current supplied to the motor 5R decreases slowly, thus preventing a rapid increase of the rotational speed of the motor 5R.

At this point of time, the output voltage of the differentiator 8-2R decreases in accordance with the change of the output voltage $V_{FBR}$ because the amplification factor increases as the change increases. As a result, the quantity of addition to the output voltage of the differential amplifier 8-1R supplied to the adder 8-3R decreases, so that the decrease of the output voltage $V_{O1R}$ and the increase of the output voltage $V_{O2R}$ occur in accordance with the quantity of addition. That is, a predetermined value is subtracted from the voltage supplied between the opposite terminals of the motor 5R in accordance with the change of the output voltage $V_{FBR}$, so that the value increases as the voltage change increases.

Then, the steering velocity and the motor rotational velocity are balanced so that the increase of $V_{FBR}$ follows the increase of $V_{IN}$ to keep the voltage difference between the opposite terminals of the motor 5R constant. At this point of time, the change or the output voltage $V_{FBR}$ is smaller than that at the time of the starting of the rotation of the motor 5R, so that the predetermined value to be subtracted from the voltage supplied between the opposite terminals of the motor 5R is set to a smaller value.

When the change of $V_{IN}$ stops upon the completion of the steering operation (at time t3 shown in FIG. 3(a)), the difference between $V_{IN}$ and $V_{FBR}$ begins to be narrowed from the previous constant value. As a result, the output voltage $V_{O1R}$, which has been supplied as a constant voltage value, begins to decrease, and the output voltage $V_{O2R}$, which has also been supplied as a constant voltage value, begins to increase. Accordingly, the voltage difference supplied between the opposite terminals of the motor 5R changes continuously so as to be narrowed, so that the current supplied to the motor 5R decreases slowly.

At this point of time, the predetermined value to be subtracted from the voltage supplied between the opposite terminals of the motor 5R decreases as the change of the output voltage $V_{FBR}$ decreases. As a result, the motor 5R is lightly braked before the actual illuminating angle reaches the target illuminating angle, so that overshooting due to the force of inertia is avoided. Accordingly, the difference between $V_{FBR}$ and $V_{IN}$ is set to zero so that the rotation of the motor 5R stops soon (at time t4 shown in FIG. 3(a)).

The operation of the illuminating direction control circuit 8R in the case where the operation mode switching circuit 8-7R and the lamp on/off circuit 8-8R are provided will now be described with reference to the above-discussed basic operation.

Consider now the case of rightward steering with respect to the position of straight steering as a start point. Assuming now that the steering wheel is in the position of straight steering, then an output voltage $V_{IN}$ (6 V in this embodiment) in accordance with the position is obtained from the steering sensor 7. The output voltage $V_{IN}$ is supplied to the differential amplifier 8-1R and also supplied to the operation mode switching circuit 8-7R.

In the operation mode switching circuit 8-7R, the comparative reference voltage $V_{1R}$ and the output voltage $V_{IN}$ are compared. Because $V_{1R} > V_{IN}$, the outputs of the comparators $CP1_R$ and $CP2_R$ are set to the "0" level. As a result, the transistor $Tr5_R$ is switched on, so that a tap voltage is produced at the junction of the resistors $R18_R$ and $R19_R$. The tap voltage is forcedly supplied to the noninverting input terminal of the operational amplifier $OP1_R$ in the differential amplifier 8-1R through line L1. That is, the input voltage $V_{INR}$ applied to the noninverting input terminal of the operational amplifier $OP1_R$ is kept constant, irrespective of the output voltage $V_{IN}$ of the steering sensor 7. As a result, a control mode in which the output voltage $V_{IN}$ of the steering sensor 7 has a value corresponding to the illuminating angle of 30° in the right direction is set in the right illuminating direction control circuit 8R so that the illuminating angle is forcedly set to 30° in the right direction.

On the other hand, in the lamp on/off circuit 8-8R, the output of the comparator $CP3_R$ is opened because $V_{1R} > V_{IN}$. As a result, the transistor $Tr6_R$ is switched off, so that there is no current supplied to the coil of the right relay 9R. Accordingly, the right SI lamp 4R is set in a turned-off state.

Figure 4A:
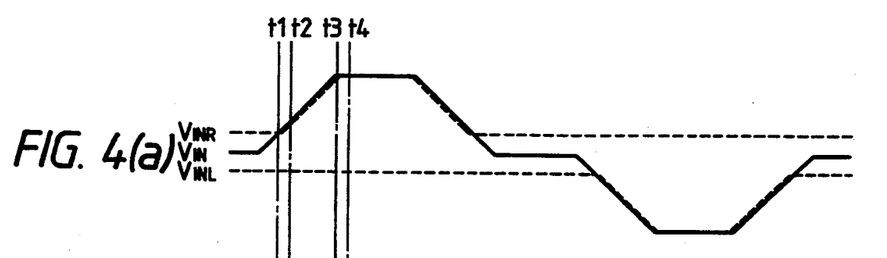
FIGS. 4(a)-4(d) are waveform diagrams for explaining the basic operation of a right illuminating direction control circuit in the case where an operation mode switching circuit and a lamp on/off circuit are provided in the cornering lamp system.
Figures 4B, 4C:
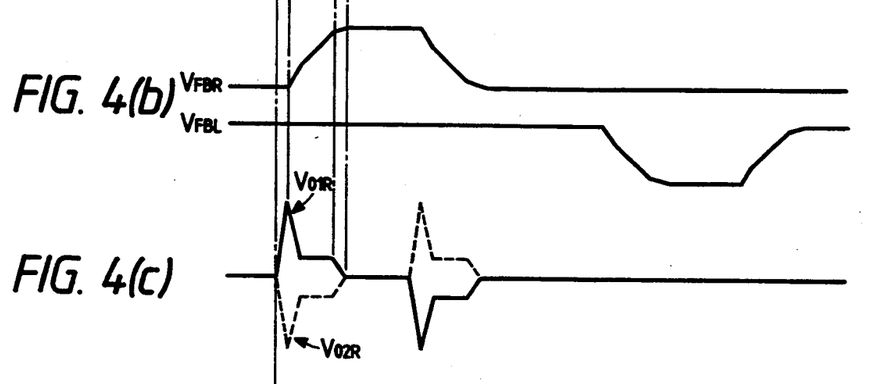
Figure 4D:
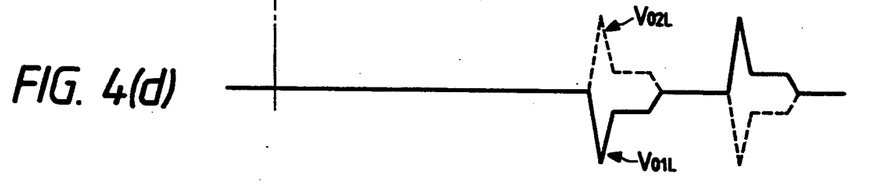

When rightward steering is carried out from the above-mentioned state, the output voltage $V_{IN}$ increases. When the steering angle then reaches $\theta_R$ so that $V_{1R} < V_{IN}$, the outputs of the comparators $CP1_R$ and $CP2_R$ are opened so that the transistor $Tr5_R$ is switched off to thereby set the junction of the resistors $R18_R$ and $R19_R$ at a high impedance. Accordingly, in the differential amplifier 8-1R, the input voltage $V_{INR}$ to the noninverting input terminal of the operational amplifier $OP1_R$ thereof changes in accordance with the output voltage of the steering sensor 11 (time t1 FIG. 4(a)), so that the $V_{IB}$ illuminating direction of the right SI lamp 4R changes in accordance with rightward steering from this point of time.

On the other hand, in the lamp on/off circuit 8-8R, the output of the comparator $CP3_R$ is set to the "0" level because $V_{1R} < V_{IN}$. As a result, the transistor $Tr6_R$ is switched on, so that current is supplied to the coil of the right relay 9R to thereby turn on the right SI lamp 4R.

That is, according to the present invention, the right SI lamp 4R is turned off and the illuminating angle is fixed to 30° in the rightward direction until the angle of rightward steering with respect to the position of straight advance steering reaches $\theta_R$. Then, from the point of time when the steering angle reaches $\theta_R$, the right SI lamp 4R is turned on and the illuminating angle changes in accordance with the steering direction.

When the steering angle is reduced to a smaller value than $\theta_R$ because of leftward steering after the steering angle reaches $\theta_R$, the illuminating angle of the right SI lamp 4R is fixed to 30° in the rightward direction, and the state of the lamp 4R is returned from the on state to the off state in accordance with the outputs of the operation mode switching circuit 8-7R and the lamp on/off circuit 8-8R.

The same operation as in the right illuminating direction control circuit 8R is carried out in the left illuminating direction control circuit 8L. That is, when leftward steering with respect to the position of straight-ahead steering is carried out, the left SI lamp 4L is turned off and the illuminating angle thereof is fixed to 30° in the leftward direction until the angle of leftward steering reaches $\theta_L$. Then, from the point of time when the steering angle reaches $\theta_L$, the left SI lamp 4L is turned on and the illuminating angle changes in accordance with the steering direction.

Figure 5:
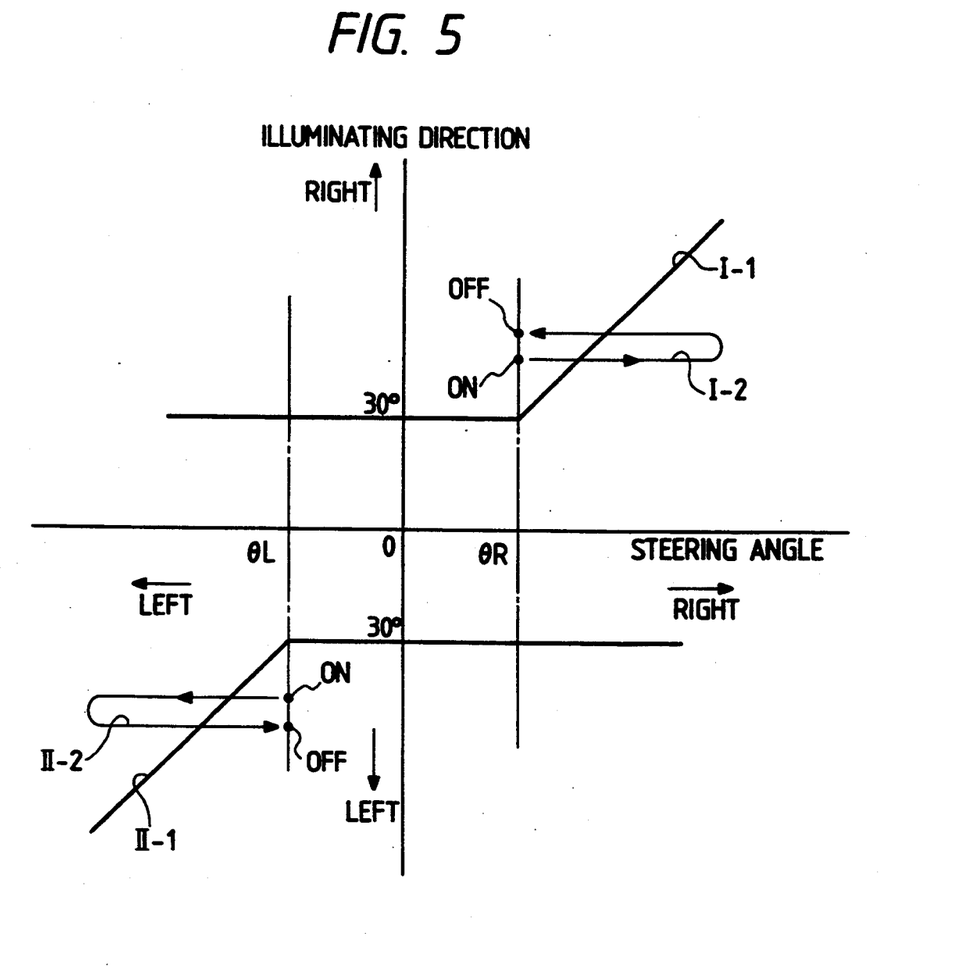
FIG. 5 is a graph showing illuminating direction changing characteristics and turn-on/off characteristics of the right and left SI lamps in the inventive cornering lamp system.

FIG. 5 shows illuminating angle changing characteristics (illuminating direction changing characteristics) and on/off characteristics of the right and left SI lamps 4R and 4L in accordance with the steering angle. In the drawing, I-1 and I-2 represent the illuminating direction changing characteristic and on/off characteristics of the right SI lamp 4R, and II-1 and II-2 represent the illuminating direction changing characteristic and on/off characteristics of the left SI lamp 4L.

Figure 6:
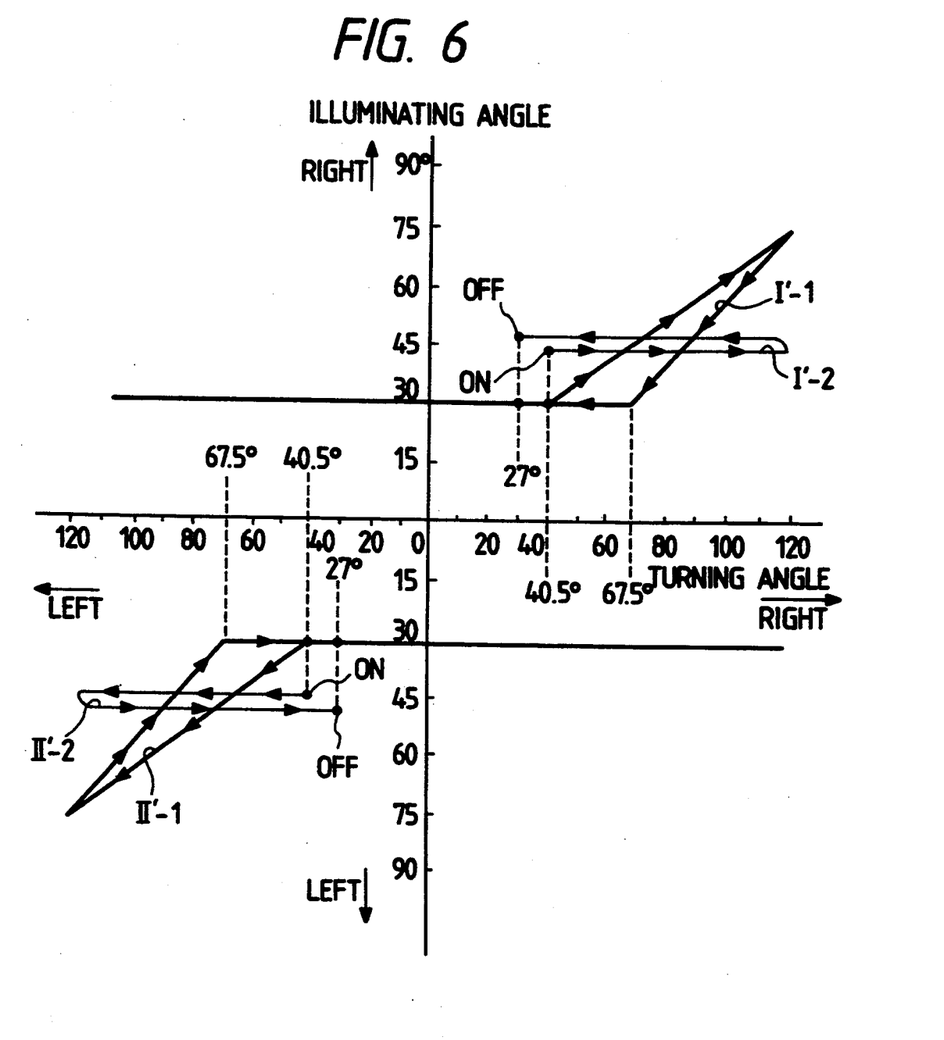
FIG. 6 is a graph showing another example of the illuminating direction changing characteristics and turn-on/off characteristics of the right and left SI lamps.

Although the above description relates to the case where the illuminating direction changing characteristics and the on/off characteristics of the right and left SI lamps 4R and 4L are as shown in FIG. 5, the invention can be applied to the case where the characteristics are as shown in FIG. 6.

According to the characteristics, when, for example, the turning angle of the handle reaches 40.5° by rightward steering with respect to the position of straight-ahead steering as a start point, the right SI lamp 4R is switched on. When the steering angle is subsequently reduced to a smaller value than 27° by leftward steering after the angle reaches 40.5°, the right SI lamp 4R is switched off. Accordingly, the lamp is prevented from being repetitively turned on and off by slight turning of the handle by changing the timing between the start of turn-on and the start of turn-off.

Further, according to the above characteristics, when rightward steering is carried out, the illuminating angle of the right SI lamp 4R is fixed at 30° in the rightward direction until the steering angle reaches 40.5°. From the point of time the steering angle reaches 40.5°, the illuminating angle of the right SI lamp 4R is changed in accordance with the steering direction. When, for example, leftward steering is carried out starting from a steering angle of 120°, the illuminating direction is changed at a higher speed than in the case of rightward steering and then fixed to 30° in the rightward direction after the point of time when the steering angle reaches 67.5°. That is, according to the above characteristics, the illuminating direction changing speed when leaving a curve is made higher than when entering the curve road. Accordingly, there is attained an illuminating direction changing operation which follows the eyes' natural motion where the eyes are turned more rapidly when entering a curve than when leaving a curve.

Alternatively, in the characteristics shown in FIGS. 5 and 6, the lighting voltage when turning off the lamp may be changed within a range of 10% of the voltage at the time the lamp is turned on. In this case, the lamp is switched on/off slowly, so that a dazzling effect which might be caused by rapid turning on/off the lamp can be prevented.

Figure 7:
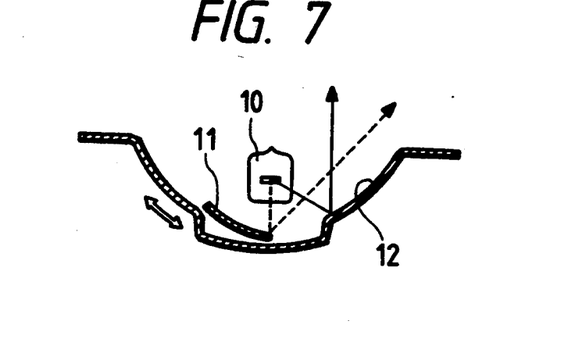
FIG. 7 is a schematic structural diagram of a sub-reflector moving type SI lamp used for both of the right and left SI lamps.

In the above description, a sub-reflector moving type lamp as shown in FIG. 7 is used for each of the right and left SI lamps 4R and 4L. In the drawing, reference numeral 10 designates a light source; 11, a sub-reflector (auxiliary reflection mirror) rotatably disposed on the rear side of the light source 10; and 12, a main reflector (main reflection mirror) stationarily disposed on the rear side of the sub-reflector 11. That is, in the above description, an SI lamp in which the main optical axis determined by the main reflector 12 is stationarily set in the forward direction (straight-ahead direction) while the auxiliary optical axis defined by the sub-reflector 11 is changed variably in accordance with the steering direction is used for the right and left SI lamps 4R and 4L.

When in such an SI lamp the sub-reflector 11 is rotated at an angle larger than 30° in the left and right directions with respect to the main optical axis, the geometrical positional relation between the fixed beam light source 10 and the movable sub-reflector 11 is however shifted so that there arises a problem in that the main optical axis becomes obscure.

Figure 8:
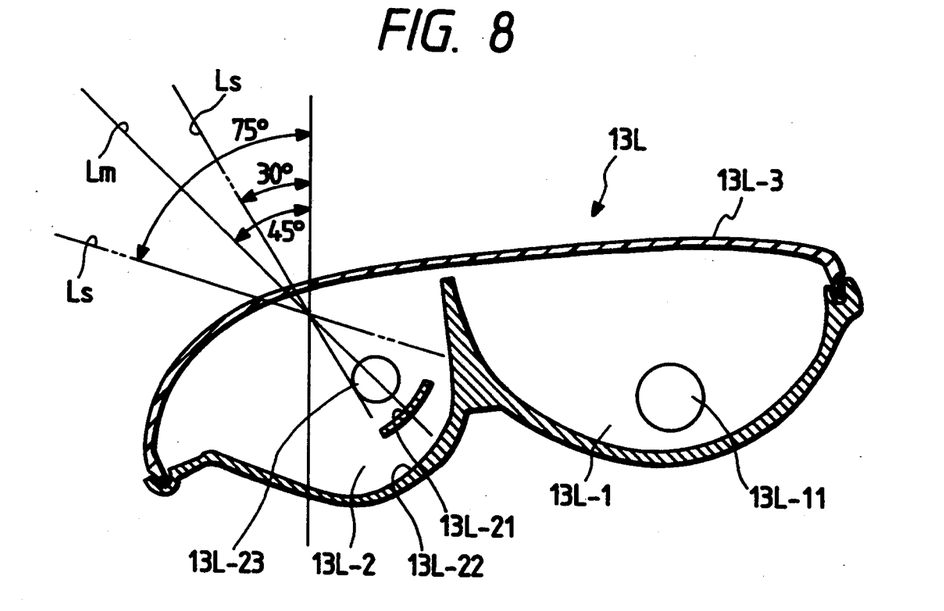
FIG. 8 is a schematic structural diagram of a left SI lamp in which the main optical axis is inclined by 45° in an SI lamp portion united with a headlamp portion or a fog lamp portion into one body.

To solve this, in a left SI lamp 13L having the structure schematically shown in FIG. 8, an SI lamp portion 13L-2 united with a headlamp portion or a fog lamp portion 13L-1 into one body is provided so that the main optical axis Lm is inclined to the left with respect to the forward direction and the auxiliary optical axis Ls is changed variably in a range of 30° to 75° with respect to the forward direction. That is, the illuminating angle of the SI lamp portion 13L-2 is 45° when the main optical axis Lm is coincident with the auxiliary optical axis Ls, 30° when the auxiliary optical axis Ls is rotated to the left by 15° with respect to the main optical axis Lm, and 75° when the auxiliary optical axis Ls is rotated to the left by 30° with respect to the main optical axis Lm.

Further, in FIG. 8, reference numeral 13L-3 designates a lens; 13L-21, a sub-reflector; 13L-22, a main reflector; and 13L-11 and 13L-23, light bulbs.

As is evident from the above description, in accordance with the present invention, when the steering angle is in a range from a predetermined value $\theta_L$ to a predetermined value $\theta_R$, each of the left lighting means and the right lighting means is on standby in a turned-off state while the illuminating directions thereof are set respectively to predetermined angles in the left and right directions of the vehicle. When the steering angle reaches $\theta_R$, the right lighting means is turned on and the illuminating direction thereof begins to be changed in accordance the steering direction. When the steering angle reaches $\theta_L$, the left lighting means is turned on and the illuminating direction thereof begins to be changed in accordance with the steering direction. Accordingly, the amount of electric power consumed by the lamps can be suppressed compared with the conventional cornering lamp system in which the left and right SI lamps are switched on continuously.

What is claimed is:

1. A vehicular cornering lamp system for variably changing the illuminating direction of a right lighting means disposed on the right side of the front of a vehicle while fixing the illuminating direction of a left lighting means disposed on the left side of the vehicle when said vehicle is being steered to the right in accordance with a rightward steering angle of said vehicle with respect to a straight-ahead steering position, and for variably changing the illuminating direction of the left lighting means while fixing the illuminating direction of the right lighting means when said vehicle is steered to the left in accordance with a leftward steering angle with respect to said straight-ahead steering position, said vehicular cornering lamp system comprising:

first illuminating direction fixing means for fixing the illuminating direction of said right lighting means at a predetermined angle in the rightward direction of said vehicle while maintaining said right lighting means in a turned-off state until said angle of rightward steering reaches a predetermined value $\theta_R$;

a second illuminating direction fixing means for fixing the illuminating direction of said left lighting means at a predetermined angle in the leftward direction of said vehicle while maintaining said left lighting means in a turned-off state until said angle of leftward steering reaches a predetermined value $\theta_L$;

a first illuminating direction changing means for changing the illuminating direction of said right lighting means in accordance with said angle of rightward steering while maintaining said right lighting means in a turned-on state when said angle of rightward steering reaches and exceeds said predetermined value $\theta_R$; and a second illuminating direction changing means for changing the illuminating direction of said left lighting means in accordance with said angle of leftward steering while maintaining said left lighting means in a turned-on state when said angle of leftward steering reaches and exceeds said predetermined value $\theta_L$.

2. The vehicular cornering lamp system of claim 1, wherein said predetermined angle in the rightward direction and said predetermined angle in the leftward direction are both approximately 30°.

3. The vehicular cornering lamp system of claim 1, wherein each of said right and left lighting means comprises a movable reflector and a motor for moving said movable reflector.

4. The vehicular cornering lamp system of claim 3, wherein each of said first illuminating direction changing means and said second illuminating direction changing means comprises:

an illuminating angle sensor for providing a voltage corresponding to said illuminating direction of the respective one of said right and left illuminating means;

a steering sensor for providing a voltage corresponding to said steering angle;

a differential amplifier receiving as differential inputs said voltage corresponding to said illuminating angle and said voltage corresponding to said steering angle;

a differentiating circuit for differentiating said voltage corresponding to said illuminating angle;

an adder circuit for adding outputs of said differential amplifier and said differentiating circuit;

a first operational amplifier receiving as inputs an output of said adder circuit and a reference voltage;

a second operational amplifier circuit receiving as inputs an output of said first operational amplifier and said reference voltage; and first and second booster circuits respectively driven by outputs of said first and second operational amplifiers, outputs of said first and second booster circuits being applied to respective first and second terminals of said motor.

5. The vehicular cornering lamp system of claim 4, wherein each of said first illuminating direction fixing means and said second illuminating direction fixing means comprises:

means for comparing said voltage corresponding to said steering angle with a voltage corresponding to the respective one of said values $\theta_R$ and $\theta_L$;

means for clamping said input of said differential amplifier receiving said voltage corresponding to said steering angle at a voltage corresponding to the respective one of said predetermined angle in the rightward direction and said predetermined angle in the leftward direction of said vehicle in response to an output of said comparing means; and means for turning the respective one of said lamps on in response to an output of said comparing means.

6. The vehicular cornering lamp system of claim 1, wherein said right lighting means is turned on when said predetermined value of said angle of rightward steering is 40.5°.

7. The vehicular cornering lamp system of claim 6, wherein said leftward steering angle is reduced to a smaller value than 27° after said angle reaches 40.5°, said right lighting means is turned off.

8. The vehicular cornering lamp system of claim 1, wherein said illuminating direction of a right lighting means changes speed when the vehicle leaves a curve higher than when entering the curve road.

9. The vehicular cornering lamp system of claim 1, wherein a lighting voltage when turning off the lighting means is changed within a range of 10% of the voltage at the time then lighting means is turned on.

10. The vehicular cornering lamp system of claim 1, further comprising: a light source; a sub-reflector rotatably disposed on a rear side of said light source; and a main reflector stationarily disposed on a rear side of said sub-reflector.

* * * * *